US006985799B2

(12) United States Patent
Zalesski et al.

(10) Patent No.: US 6,985,799 B2
(45) Date of Patent: Jan. 10, 2006

(54) ENERGY STORAGE MODULES AND MANAGEMENT SYSTEM

(75) Inventors: George Zalesski, Vestal, NY (US); Garey George Roden, Apalachin, NY (US)

(73) Assignee: BAE Systems Controls, Inc., Johnson City, NY (US)

( * ) Notice: Subject to any disclaimer, the term of this patent is extended or adjusted under 35 U.S.C. 154(b) by 46 days.

(21) Appl. No.: 10/249,856

(22) Filed: May 13, 2003

(65) Prior Publication Data

US 2004/0230343 A1 Nov. 18, 2004

(51) Int. Cl.
H02J 7/00 (2006.01)

(52) U.S. Cl. .................. 700/286; 700/295; 700/297; 700/298; 700/22; 307/62; 307/80; 307/82

(58) Field of Classification Search ............. 700/22, 700/286, 827, 295–298; 307/62, 80, 82
See application file for complete search history.

(56) References Cited

U.S. PATENT DOCUMENTS

| 4,467,407 | A | * | 8/1984 | Asano et al. ............... 363/43 |
| 4,804,052 | A | * | 2/1989 | Griffen .................... 177/25.14 |
| 4,886,981 | A | * | 12/1989 | Lentini et al. .............. 307/87 |
| 5,168,206 | A | * | 12/1992 | Jones ....................... 320/31 |
| 5,451,858 | A | * | 9/1995 | Van Duyne et al. ........ 323/281 |
| 5,612,580 | A | * | 3/1997 | Janonis et al. ............. 307/64 |
| 5,745,356 | A | * | 4/1998 | Tassitino, Jr. et al. ....... 363/71 |
| 5,828,201 | A | | 10/1998 | Hoffman, Jr. et al. |
| 5,869,950 | A | | 2/1999 | Hoffman, Jr. et al. |
| 5,907,194 | A | * | 5/1999 | Schenk et al. ............. 307/10.1 |
| 6,134,122 | A | * | 10/2000 | Chen et al. ................. 363/21 |
| 6,140,800 | A | | 10/2000 | Peterson |
| 6,169,669 | B1 | * | 1/2001 | Choudhury ................. 363/37 |
| 6,201,319 | B1 | * | 3/2001 | Simonelli et al. ........... 307/26 |
| 6,295,216 | B1 | * | 9/2001 | Faria et al. ................. 363/44 |
| 6,356,471 | B1 | * | 3/2002 | Fang ........................ 363/65 |
| 6,415,892 | B2 | * | 7/2002 | Araki et al. ............... 187/290 |
| 2003/0107349 | A1 | * | 6/2003 | Haydock et al. ............ 322/28 |

OTHER PUBLICATIONS

El-Sharkawi, "Fundamentals of Electric Drives" Apr. 10, 2000, Brooks Cole, $1^{st}$ edition, pp. 9–11.*

(Continued)

Primary Examiner—Leo Picard
Assistant Examiner—Sean Shechtman
(74) Attorney, Agent, or Firm—Charles L. Moore; Geoffrey H. Krauss

(57) ABSTRACT

A system to manage energy may include a plurality of energy storage modules. Each energy storage module may include a power converter couplable to a link and a power converter controller to control operation of the power converter. Each energy storage module may also include at least one energy storage unit connected only to the power converter. The system may also include a power management controller to control power delivery from each of the plurality of energy storage modules to the link and to control power delivery to each of the plurality of energy storage modules. Each power converter may include a hardware voltage loop to generate a first signal in response to a line voltage and voltage command signal, and a hardware current loop to generate a second signal in response to the first signal, a line current and a command current signal, wherein the power converter is adjustable in response to the second signal to apply a predetermined power from the link to the at least one energy storage unit or to supply a selected power from the at least one energy storage unit to the link.

39 Claims, 3 Drawing Sheets

OTHER PUBLICATIONS

The Authoritative Dictionary of IEEE Standards Terms 2000, 7$^{th}$ edition, Standards Information Network IEEE Press, pp. 246–247.*

The Microsoft Computer Dictionary 1999, 4$^{th}$ edition, Microsoft Press, pp. 261.*

Sebastian, "Average–Current–Mode Control of Two–Input Buck Postregulators Used in Power–Factor Correctors" Jun. 1999, IEEE Transactions on Industrial Electronics vol. 46, No. 3.*

The Authoritative Dictionary of IEEE Standards Terms 2000, 7$^{th}$ edition, Standards Information Network IEEE Press, p. 693.*

SEMTECH "Hysteretic Controller", Mar. 1, 2000.

* cited by examiner

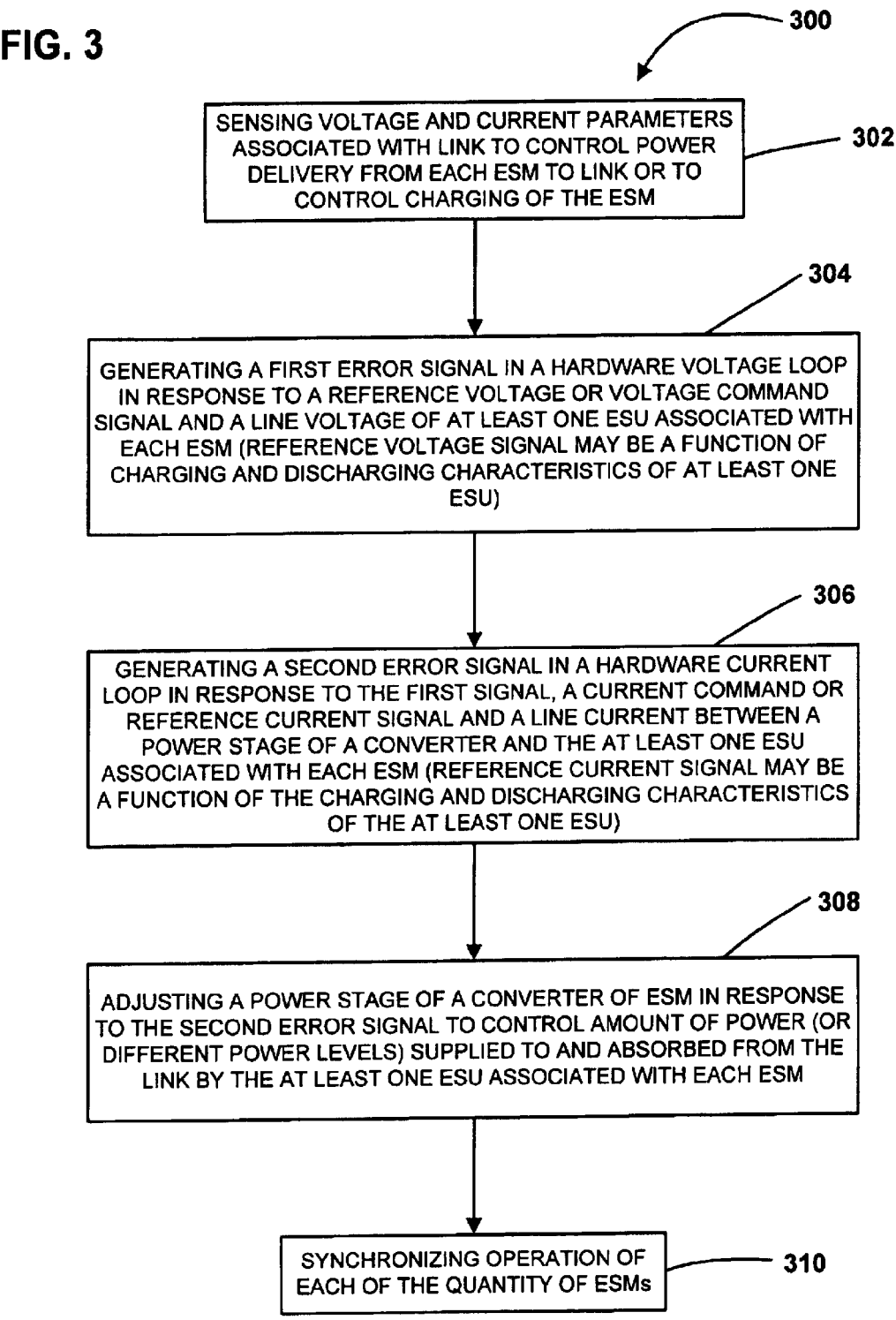

ENERGY STORAGE MODULES AND MANAGEMENT SYSTEM

CROSS REFERENCE TO RELATED APPLICATIONS

This application is related to application Ser. No. 10/249,855 filed on the same date as this application, entitled "Power Management System Including a Variable Voltage Link" by George Zalesski, assigned to the same assignee as this application and incorporated herein by this reference.

BACKGROUND OF INVENTION

Field of the Invention

The present invention relates generally to energy storage, and more particularly to energy storage modules and a management system to control the charging of energy storage units contained in the modules and to control the delivery of power from the energy storage units.

In the search for alternate sources of power, energy storage devices or units, such as batteries, super capacitors and other types of energy storage devices are being implemented to power various types of equipment and systems, such as vehicles and the like. Energy storage and management systems are needed to provide efficient charging of energy storage units and efficient use of the stored energy. An energy storage unit or units and an associated management system need to provide sufficient energy storage capacity to operate a system, such as a vehicle or the like, for extended periods of time under various environmental conditions. Additionally, the energy storage management system needs to be able to efficiently manage varying demands for power under different load conditions.

Currently known energy management systems do not have the flexibility to add additional energy storage units without impacting or requiring modification to the system architecture. Additionally, current systems are not easily adaptable to accommodate mixing or combining energy storage units of different technologies, such as different types of batteries, super capacitors or other types of energy storage devices. Also, when using multiple batteries to provide sufficient energy storage capacity or power, the batteries need to be equalized because of manufacturing and performance variations, degradation of the units over time, uneven power distribution and differences in battery impedance. Current energy management systems also do not permit the performance of maintenance procedures while the system remains operational. Large energy storage units or a combination of energy storage units needed in high power applications, such as powering a vehicle or the like, can also present high voltage safety concerns and require more robust equipment in monitoring and maintaining the system.

Accordingly, for the reason stated above, and for other reasons that will become apparent upon reading and understanding the present specification, there is a need for an energy storage and management system that provides efficient charging of energy storage units and efficient use of the stored energy under varying power demands and conditions. There is also a need for an energy storage and management system that is flexible in permitting energy storage units to be added without impacting or requiring modification to the system architecture and that can accommodate different types of battery technology or different combinations of types of energy storage units at the same time. There is also a need for an energy storage and management system that does not require equalization, is independent of manufacturing and performance variations, degradation, uneven power distribution and differences in battery impedance and permits the performance of maintenance procedures while the system remains operational.

SUMMARY OF INVENTION

In accordance with the present invention, a system to manage energy may include at least one energy storage module and a power management controller. The management controller may control power delivery from the at least one energy storage module to a link or bus and may control charging of the at least one energy storage module.

In accordance with another embodiment of the present invention, a system to manage energy may include a plurality of power converters and a multiplicity of energy storage units. At least one energy storage unit of the multiplicity of energy storage units may supply power to an associated one or associated ones of the plurality of power converters and may receive power from the associated one or associated ones of the plurality of power converters.

In accordance with another embodiment of the present invention, a method of managing application of different power levels to a link or bus may include controlling a quantity of energy storage modules coupled to the link. The method may also include controlling an amount of power supplied to the link by each energy storage module.

BRIEF DESCRIPTION OF DRAWINGS

In the drawings, like numerals describe substantially similar components throughout the several views. Like numerals having different letter suffixes or primed (X') represent different occurrences of substantially similar components.

FIG. 3 is a flow chart of an example of a method of operation of the energy storage management system and energy storage module of FIGS. 1 and 2 in accordance with an embodiment of the present invention.

DETAILED DESCRIPTION

In the following detailed description of the preferred embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments can be utilized and that process or mechanical changes may be made without departing from the scope of the present invention.

Figure 1:
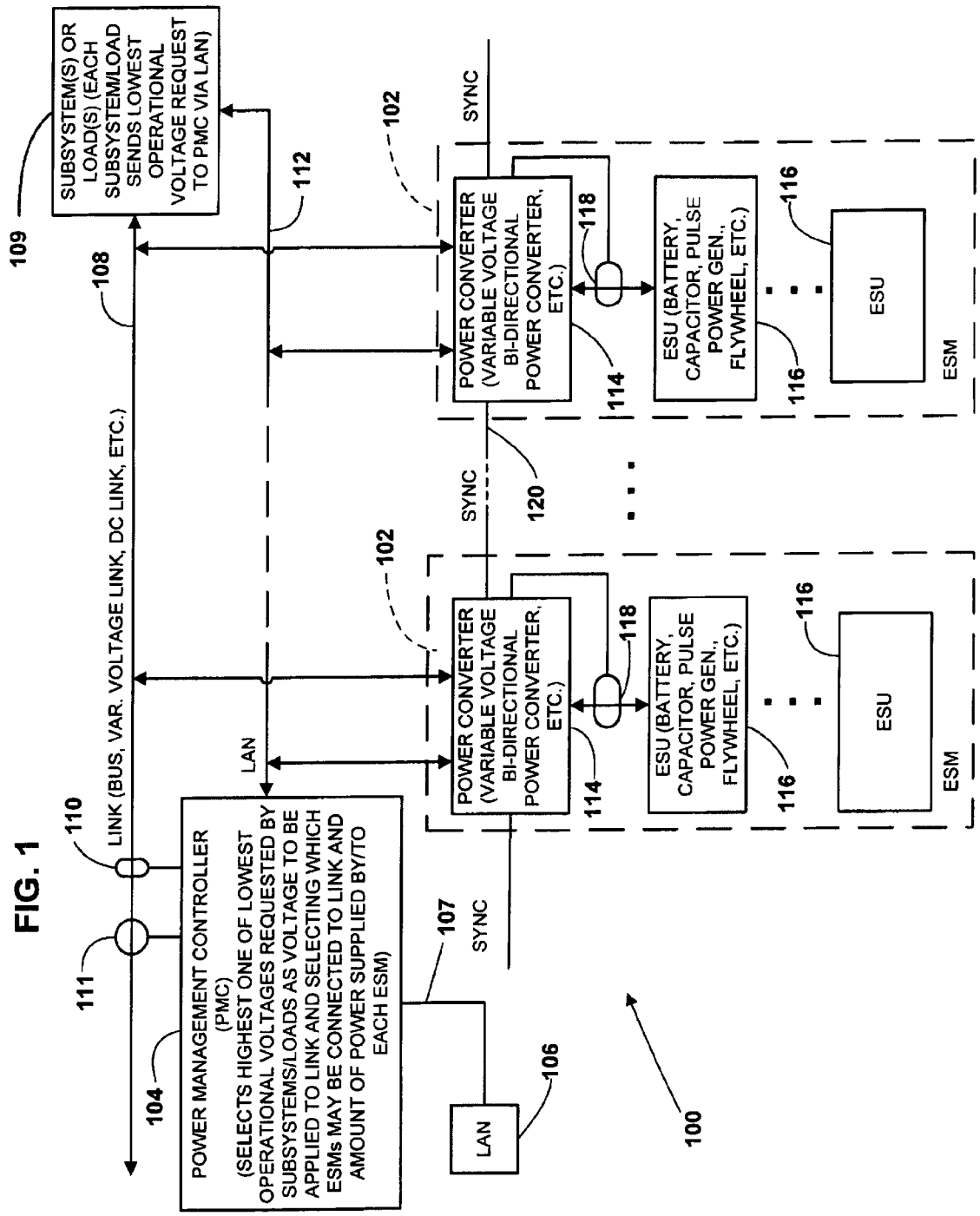
FIG. 1 is a block schematic diagram of an energy storage management system including energy storage modules.

FIG. 1 is a block schematic diagram of an energy storage management system 100. The energy storage management system 100 may include a multiplicity of energy storage modules (ESMs) 102 or the like. The energy storage management system 100 may also include a power management controller 104. The power management controller 104 may be a central processing unit (CPU), microprocessor, programmable controller or the like. The power management controller 104 may be coupled to a local area network (LAN) 106 by a LAN cable connection 107. The LAN 106 may be used to monitor and control operation of the power management controller 104 and the system 100 and to program or download additional software or corrections to the power management controller 104. The energy storage management system 100 may be coupled to a bus or voltage link 108 or in some applications the link 108 may be considered to be part of the system 100. The link 108 may be coupled to one or more subsystems or loads 109 that can be supplied power from the energy storage modules 102 by the voltage link 108. The link 108 may selectively supply power from the multiplicity of energy storage units 102 to at least one subsystem or load 109.

The link 108 may be a direct current (DC) link. The link 108 may also be a variable voltage link or the like. The voltage supplied or delivered by the variable voltage link may be optimized. Each subsystem or load 109 may request a lowest operational voltage based on a present or current operating point of the subsystem or load 109. Each subsystem or load 109 may send a signal to the power management controller 104 via a LAN connection 112 to request the lowest operational voltage. The power management controller 104 may then select the highest one of the plurality of lowest operational voltages requested as the voltage to be applied to the link 108. An example of a variable voltage link is described in U.S. patent application Ser. No. 10/249,855, entitled "Power Management System Including a Variable Voltage Link," which is incorporated herein by reference as indicated above.

The power management controller 104 maybe connected to a current sensing device 110 and a voltage sensing device 111. The current sensing device 110 senses current flowing in the link 108 and the voltage sensing device 111 senses voltage between the link 108 and ground potential. The current sensing device 110 and the voltage sensing device 111 provide feedback to the power management controller 104 to control power delivery from the energy storage modules 102 to the link 108 or to control charging of the energy storage modules 102 as indicated in block 302 of method 300 of FIG. 3.

The power management controller 104 may also be coupled to one or more energy storage modules 102. The coupling between the controller 104 and each of the energy storage modules 102 may be via the LAN connection 112. Each of the energy storage modules 102 may include at least one power converter 114. The power converter 114 may be a variable voltage bi-directional power converter or the like. The power converter 114 may be connected to one or more associated energy storage units (ESUs) 116. The energy storage units 116 may be batteries, super capacitors, pulse power generators, flywheels or other types of energy storage devices. The energy storage units 116 associated with any one power converter 114 may be the same type technology, such as all nickel metal hydride (NiMH) batteries, nickel cadmium (NiCd) batteries, lithium ion (Li) batteries or the like. However, each energy storage module 102 is independent and may include energy storage units 116 that are of a different type technology compared to energy storage units 116 contained in other energy storage modules 102 of the system 100. Accordingly, the energy storage management system 100 permits mixing different types of battery or energy storage technologies. Each energy storage module 102 may include a selected number of energy storage units 116 to provide a predetermined energy storage capacity and to be able to deliver a predetermined amount of power to the link 108 depending upon power demands and conditions. The energy storage units 116 in each module 102 may be connected in series to provide the predetermined energy storage capacity.

The power converter 114 of each energy storage module 102 controls the amount of power from the associated energy storage units 116 that may be applied to the link 108. The power converter 114 also controls the charging of the associated energy storage unit 116 or units. The power management controller 104 may be connected to each of the power converters 114 in each module 102. The power management controller 104 may then selectively control which power converters 114 may be connected to the link 108 to deliver different power levels to the link 108 according to power demands and operating conditions. Accordingly, the power management controller 104 may manage the application of different power levels to the link 108. The power management controller 104 can control the quantity of energy storage modules 102 coupled to the link 108 and can control the power converter 114 of each module 102 to control an amount of power supplied to the link 108 by the associated energy storage units 116.

The power converter 114 may also be connected to a current monitoring device 118 to monitor and control current flowing between the power converter 114 and the associated energy storage unit 116 or units. By monitoring the current, the power converter 114 can control the charging of the energy storage unit 116 or the application of power to the link 108 by the energy storage unit 116.

If the system 100 includes more than one energy storage module 102, the modules may be synchronized by a sync connection 120 to coordinate operation of the energy storage modules 102 for efficient and stable operation of the system 100 and coordinated application of power from the multiple energy storage modules 102 to the link 108 as indicated by block 310 of method 300 of FIG. 3. The sync connection 120 may also be used to coordinate the charging of the one or more energy storage units 116 associated with each power converter 114 (block 310 of FIG. 3).

The power management controller 104 can control the quantity of energy storage modules 102 coupled to the link 108 and the power converter 114 under direction of the power management controller 104 can control the amount of power supplied to the link 108 by each energy storage module 102. The quantity of energy storage modules 102 coupled to the link 108 and the amount of power supplied to the link 108 by each energy storage module 102 may be controlled by sensing voltage and current parameters associated with the link 108 as indicated in block 302 of method 300 of FIG. 3).

Figure 2:
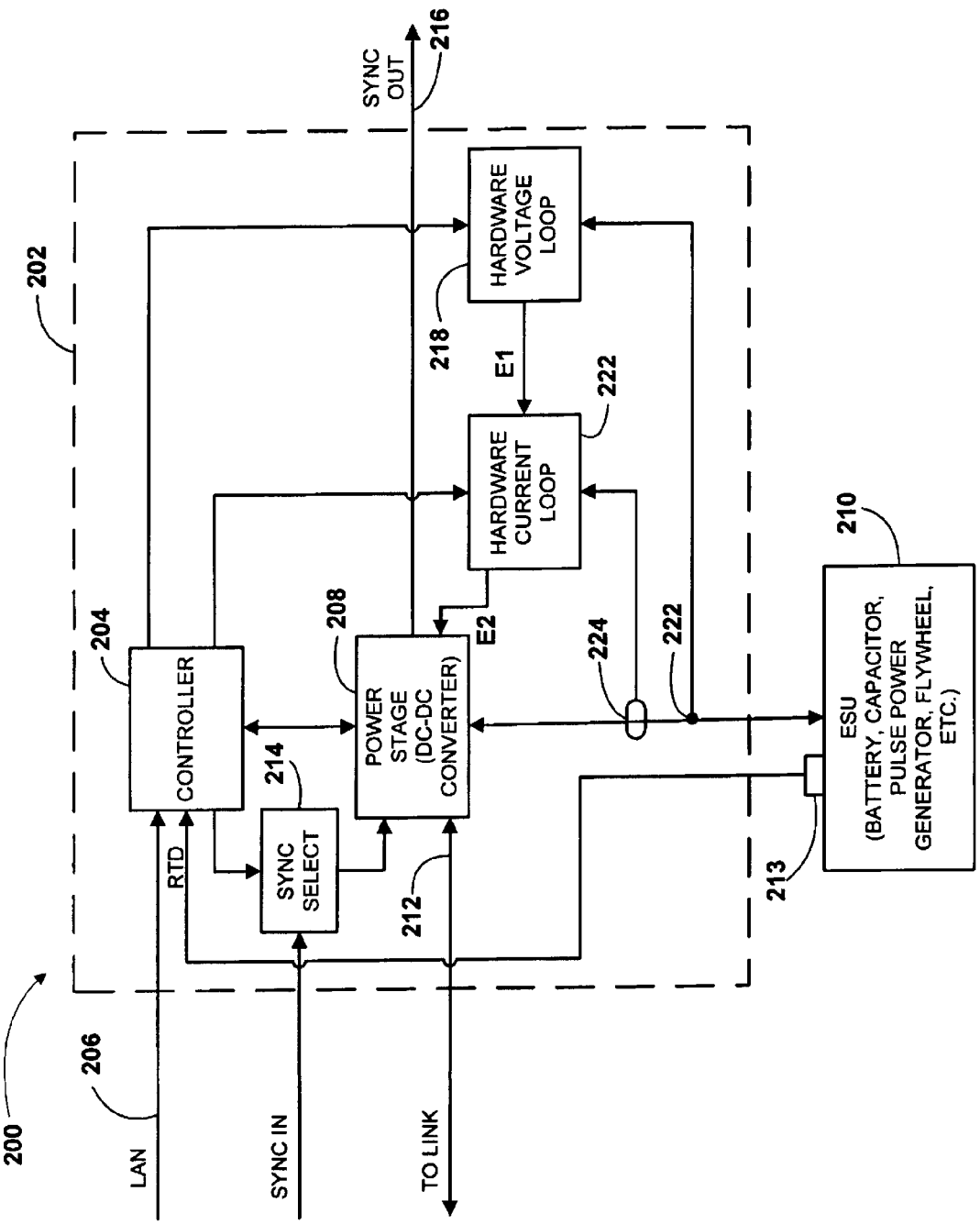
FIG. 2 is a block schematic diagram of an energy storage module in accordance with the present invention.

FIG. 2 is a block schematic diagram of an energy storage module 200 in accordance with the present invention. The energy storage module 200 may be used for the energy storage module 102 in FIG. 1. The energy storage module 200 may include a power converter 202 that may be the same as the power converter 114 in FIG. 1. The power converter 202 may include a controller 204. The controller 204 may be a digital controller, such as a microprocessor or the like. The controller 204 may be connected to a LAN connection 206 that may be substantially similar to the LAN connection 112 in FIG. 1. The controller 204 may be connected to a power or conversion stage 208. The power stage 208 may be a direct current-to-direct current (DC-DC) converter. The power stage 208 may be connected to an energy storage unit (ESU) 210 or units that may be connected in series, substantially similar to ESUs 116 in FIG. 1. The power stage 208 conditions and adjusts the power from the energy storage unit 210 for application to a link substantially the same as the link 108 in FIG. 1 by a connection 212. The power stage 208 may also condition and adjust the power from the link 108 when the energy storage unit 210 is being charged. Thus, the power converter 202 also monitors and controls not only application of power to the link 108 but also monitors and controls charging of the energy storage unit 210 (or 116 in FIG. 1). In supplying power from the energy storage unit 210 or charging the energy storage unit 210, the temperature of the energy storage unit 210 may be monitored by a temperature sensor 213. A signal "RTD" corresponding to the temperature of the energy storage unit 210 may be transmitted from the temperature sensor 213 to the controller 204 to control charging of the energy storage unit 210 or drawing power from the unit 210.

The energy storage module 200 may also include a sync select switch 214. The sync select switch 214 may be used when the energy management system 100 (FIG. 1) includes more than one energy storage module 200. The sync select switch 214 may synchronize or coordinate operation of the multiple power converters 202 to control charging of the associated energy storage unit 210 or to provide a predetermined power from each of the multiple power converters 202 to the link 108 (FIG. 1). The sync select switch 214 may select between a sync signal generated by the controller 204 or a "sync in" signal from another module 200. The sync signal is transmitted from the sync select switch 214 to the power stage 208. The first energy storage module 200 in a system, such as system 100 in FIG. 1, can acquire the sync signal from the controller 204 associated with the module 200. A sync signal may then be transmitted from the power stage 208 to a sync select switch 214 in a subsequent module 200 as indicated by the "sync out" terminal 216 in FIG. 2.

The power converter 202 may also include a hardware voltage loop 218 to generate a first signal or first error signal E1. The hardware voltage loop 218 may be connected to a node 220 to obtain a line voltage between the power stage 208 and the energy storage unit 210. The hardware voltage loop 218 may also receive a reference voltage or voltage command signal from the controller 204. The reference voltage or voltage command may be programmed into an algorithm contained in the controller 204 to control the charging of the energy storage unit 210 or application of power from the energy storage unit 210. The reference voltage maybe based on the charging or discharging characteristics of the energy storage unit 210, as indicated in block 304 of method 300 of FIG. 3, or may be based on other parameters depending upon the particular function being performed by the energy storage module 200. The hardware voltage loop 218 generates the first signal or first error signal E1 in response to a difference between the line voltage at node 220 and the voltage command or reference voltage from the controller 204 as also indicated in block 304 of method 300 of FIG. 3.

The first error signal E1 may be transmitted from the hardware voltage loop 218 to the hardware current loop 222. The hardware current loop 222 may be coupled to a current sensing device 224 to sense a line current flowing between the power stage 208 and the energy storage unit 210. The hardware current loop 222 may also be coupled to the controller 204 to receive a current command signal or reference current. The reference current may be based on the charging or discharging characteristics of the energy storage unit 210, as indicated in block 306 of method 300 of FIG. 3, or may be based on other parameters depending upon the particular function being performed by the energy storage module 200. The hardware current loop 222 may generate a second signal or second error signal E2 in response to the first error signal, the line current between the power stage 208 and the energy storage unit 210 and the command current signal as indicated by block 306 of method 300 of FIG. 3. The power stage 208 may be adjusted in response to the second signal E2 to apply a predetermined power from the link 108 (FIG. 1) to the energy storage unit 210 or to supply a selected power from the energy storage unit 210 to the link 108 as indicated by block 308 of method 300 of FIG. 3.

The hardware voltage loop 218 and the hardware current loop 222 may each include an operational amplifier to respectively compare voltage and current values associated with the energy storage unit 210 to reference or command voltage and current values from the controller 204. Accordingly, the power supplied by each energy storage module 200 includes adjusting a current and voltage output from each storage module 200 in response to comparing the voltage and current values of the at least one energy storage unit 210 to the reference or command voltage and current values respectively.

The present invention thus provides energy storage modules and an energy storage management system that provides efficient charging of energy storage units and efficient application of the stored energy under varying power requirements and conditions to a link. The energy storage and management system of the present invention is flexible in permitting the addition of energy storage units without impacting the system architecture and permits use of different types of battery technology. The energy storage and management system of the present invention also does not require separate equalization circuitry as the system can perform the equalization function for energy storage technologies that may require equalization. The energy storage and management system of the present invention also permits energy storage modules to be isolated to perform maintenance while other energy storage modules remain active. The system can also optimize efficiency by running the power converters at the optimum point by varying the number of active converters. The power converters can be selectively activated while keeping the same total power to maintain an equal state of charge on all energy storage units. Because the energy storage units are not wired in series, the individual battery voltages are at the cell or battery voltage thus substantially reducing the potential shock hazard and permitting the less expensive low voltage monitoring devices to be used.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A system to manage energy, comprising:
   a plurality of energy storage modules, wherein each energy storage module includes:
   a power converter couplable to a link,
   a power converter controller to control operation of the power converter, and
   at least one energy storage unit connected to only the power converter of an associated energy storage module;
   a power management controller to control power delivery from each energy storage module to the link and to control power delivery to each energy storage module; and
   a signaling connection interconnecting the power management controller, each power converter controller of each of the plurality of energy storage modules and at least one load connected to the link, to send signals to control power delivery to the link.

2. The system of claim 1, wherein the at least one energy storage unit is one of a battery, a capacitor, a pulse power generator or a flywheel.

3. The system of claim 1, wherein the power converter of each of the plurality of energy storage modules comprises a power stage to adjust the power delivered to the link and charging of the at least one energy storage unit.

4. The system of claim 3, wherein the power stage comprises a direct current-to-direct current converter.

5. A system to manage energy, comprising:
at least one energy storage module including:
a power converter,
a power converter controller to control operation of the power converter, and
at least one energy storage unit connected to the power converter;
a power management controller to control power delivery from the at least one energy storage module to a link and to control power delivery to the at least one energy storage module;
a hardware voltage loop to generate a first signal in response to a line voltage and a voltage command signal from the power converter controller, wherein the line voltage is measured at a node between the power converter and the at least one energy storage unit; and
a hardware current loop to generate a second signal in response to the first signal, a line current, and a command current signal from the power converter controller, wherein the line current is a current between the power converter and the at least one energy storage unit and wherein the converter is adjustable in response to the second signal to apply a predetermined power from the link to the at least one energy storage unit or to supply a selected power from the at least one energy storage unit to the link.

6. The system of claim 1, wherein the signaling connection comprises a local area network.

7. The system of claim 1, wherein the link comprises a variable voltage link.

8. A system to manage energy, comprising:
a plurality of bi-directional power converters each connectable to a link;
a multiplicity of energy storage units divided into groups, each group of the multiplicity of energy storage units being associated with only one of the plurality of bi-directional power converters, at least one energy storage unit of each group being able to supply power only to the associated one of the plurality of bi-directional power converters and being able to receive power only from the associated one of the plurality of power converters;
a power management controller; and
a signaling connection between the power management controller, each of the plurality of bi-directional power converters and at least one load to send signals to control power delivery to the at least one load.

9. The system of claim 8, wherein the multiplicity of energy storage units comprises different types of energy storage units.

10. The system of claim 8, wherein each power converter of the plurality of power converters comprises a power stage.

11. The system of claim 10, wherein each power converter further comprises a power converter controller to control operation of the power stage.

12. The system of claim 11, wherein each power converter further comprises:
a hardware voltage loop to generate a first signal in response to a line voltage and a voltage command signal from the power converter controller, wherein the line voltage is measured at a node between the power stage and the group of energy storage units; and
a hardware current loop to generate a second signal in response to the first signal, a line current, and a command current signal from the power converter controller, wherein the line current is a current between the power stage and the group of energy storage units and wherein the power stage is adjustable to supply to or receive from the group of energy storage units a predetermined power in response to the second signal.

13. The system of claim 8, wherein each of the plurality of power converters are synchronized with one another to coordinate power delivery to and from each of the plurality of power converters.

14. The system of claim 8, wherein the link comprises a variable voltage link to apply power from selected ones of the plurality of bi-directional power converters to the at least one load.

15. A method of managing energy, comprising:
generating a first signal in response to a voltage across at least one energy storage unit and a reference voltage signal, wherein the at least one energy storage unit is adapted to apply power to and absorb power from a link;
generating a second signal in response to a current supplied to and from the at least one energy storage unit, the first signal and a reference current signal; and
adjusting a power stage of a bi-directional converter in response to the second signal to control a level of power applied to and absorbed from the link by the at least one energy storage unit.

16. The method of claim 15, further comprising synchronizing operation of multiple bi-directional power converters to provide a predetermined power and to charge at least one energy storage unit associated with each bi-directional power converter.

17. The method of claim 15, further comprising controlling at least one power converter to apply different power levels to a link.

18. The method of claim 15, further comprising adding a selected number of energy storage units to an energy management system to provide a predetermined energy storage capacity.

19. The method of claim 15, further comprising:
selecting a highest operational voltage from a plurality of lowest operational voltages requested by each of a plurality of loads connected to the link; and
applying the highest operational voltage to the link supplying the plurality of loads.

20. A method of managing application of different power levels to a link, comprising:
controlling a quantity of energy storage modules of a plurality of energy storage modules coupled to the link by selecting which energy storage modules are connected to the link at any given time; and
controlling an amount of power supplied to the link and removed from the link by each energy storage module coupled to the link, wherein each energy storage module of the plurality of energy storage modules includes a bi-directional power converter coupled to the link and a separate group of energy storage units associated only with the bi-directional power converter in the energy storage module, and wherein the bi-directional power converter controls a level of power supplied to the link, and removed from the link, by the separate group of energy storage units.

21. The method of claim 20, wherein controlling the quantity of energy storage modules coupled to the link comprises sensing voltage and current parameters associated with the link.

22. The method of claim 20, wherein controlling an amount of power supplied to the link by each energy storage module comprises adjusting a current and voltage output from each energy storage module in response to comparing voltage and current values of at least one energy storage unit of each energy storage module to a reference voltage and current value.

23. The method of claim 20, wherein controlling an amount of power supplied to the link by each energy storage module, comprises:
generating a first signal in response to a voltage reference and a voltage of at least one energy storage unit associated with each energy storage module; and
generating a second signal in response to the first signal, a command reference signal and a current being supplied to the at least one energy storage unit associated with each energy storage module.

24. The method of claim 20, wherein controlling an amount of power supplied to the link by each energy storage module, comprises:
generating a first error signal in a hardware voltage loop;
generating a second error signal in a hardware current loop responsive to the first error signal; and
adjusting a power stage in response to the second error signal.

25. The method of claim 20, further comprising synchronizing operation of each of the quantity of energy storage modules.

26. The method of claim 20, further comprising adding a selected number of energy storage units to an energy management system to provide a predetermined energy storage capacity.

27. The method of claim 20, further comprising:
selecting a highest operational voltage from a plurality of lowest operational voltages requested by each of a plurality of loads; and
applying the highest operational voltage to a link coupled to each of the plurality of loads.

28. The method of claim 27, further comprising sending a signal from each load to a power management controller to request a lowest operational voltage.

29. The method of claim 28, wherein sending the signal to the power management controller comprises sending the signal via a LAN.

30. The system of claim 1, wherein the power management controller is adapted to receive a lowest operational voltage request from each subsystem or load of a plurality of subsystems or loads and to select a highest one of the lowest operational voltages as a voltage to be applied to the link.

31. The system of claim 30, further comprising a LAN to send a signal from each of the plurality of subsystems or loads to the power management controller to request a lowest operational voltage.

32. The system of claim 8, further comprising a sync select switch associated with each power converter to synchronize operation between the plurality of power converters.

33. The system of claim 32, wherein the sync select switch selects between a sync signal generated by a power converter controller or a sync in signal from another power converter.

34. The method of claim 16, wherein synchronizing operation of multiple converters comprises a first converter selecting a sync signal from a converter controller associated with the first converter and subsequent converters of the multiple converters each selecting a sync in signal from a previous one of the converters.

35. The method of claim 25, wherein synchronizing operation of each of the quantity of energy storage modules comprises a first energy storage module of the quantity of energy storage modules selecting a sync signal from a converter controller associated with the first energy storage module and subsequent energy storage modules of the quantity of energy storage modules each selecting a sync in signal from a previous one of the of the quantity of energy storage modules.

36. A method of making a system to manage energy, comprising:
providing a plurality of energy storage modules, wherein providing each energy storage module includes:
providing a power converter couplable to a link;
providing a power converter controller to control operation of the power converter, and
connecting at least one energy storage unit to only the power converter of an associated energy storage module;
providing a power management controller to control power delivery from each energy storage module to the link and to control power delivery to each energy storage module; and
providing a signal connection, between the power management controller, each power converter controller of each of the plurality of energy storage modules and at least one load connected to the link, to send signals to control power delivery to the link.

37. The method of claim 36, wherein connecting the at least one energy storage unit comprises connecting at least one of a battery, a capacitor, a pulse power generator or a flywheel.

38. The method of claim 36, further comprising coupling the power management controller, the at least one load and the power converter controller to a local area network.

39. The system of claim 5, wherein the voltage command signal and the current command signal are a function of charging or discharging characteristics of the at least one energy storage unit.

* * * * *